United States Patent [19]

Casses

[11] Patent Number: 5,395,259
[45] Date of Patent: Mar. 7, 1995

[54] ELECTRICAL CONNECTOR FOR A MICROCIRCUIT CARD

[75] Inventor: Calude Casses, Clevilliers, France

[73] Assignee: Framatome Connectors International, Paris la Defense, France

[21] Appl. No.: 117,716

[22] Filed: Sep. 8, 1993

[30] Foreign Application Priority Data

Sep. 9, 1992 [FR] France ............................ 92 10765

[51] Int. Cl.⁶ .............................................. H01R 29/00
[52] U.S. Cl. .................................... 439/188; 439/260; 235/475
[58] Field of Search ................... 439/188, 60, 62, 630, 439/260; 200/61.41, 573, 332, 51.09, 51.1, 51.02; 235/441, 475, 476

[56] References Cited

U.S. PATENT DOCUMENTS

| 4,743,746 | 5/1988 | Murschall et al. | 235/441 |
| 4,839,509 | 6/1989 | Yanima et al. | |
| 4,887,188 | 12/1989 | Yoshida et al. | 439/188 |
| 4,926,033 | 5/1990 | Kobayaohi | 235/475 |

FOREIGN PATENT DOCUMENTS

| 0436943 | 7/1991 | European Pat. Off. |
| 0499967 | 8/1992 | European Pat. Off. |
| 2665027 | 7/1990 | France |
| 2504720 | 10/1992 | France |

*Primary Examiner*—David L. Pirlot
*Assistant Examiner*—Hien D. Vu
*Attorney, Agent, or Firm*—Pollock, Vande Sande & Priddy

[57] ABSTRACT

The connector includes a support plate for the major face of the card opposite the face which carries contact zones. It defines a path for the insertion of the card in a given direction and includes an end-of-travel microswitch which is actuated by the front edge of the card when the latter reaches and exceeds a given position. A rocker is rotatable on the microswitch housing about an axis which is orthogonal to the direction of insertion of the card, parallel to the support plane on the plate and distant from the support plane. The rocker has, opposite the rotation axis, a finger for the front edge of the card and it has a projection for controlling the microswitch.

7 Claims, 1 Drawing Sheet

ELECTRICAL CONNECTOR FOR A MICROCIRCUIT CARD

BACKGROUND OF THE INVENTION

The present invention relates to electrical connectors for receiving a microcircuit containing card or "smart" card having electrical contact zones on a major face, and more particularly, to connectors of the type including a support plate for receiving that major face of the card which is opposite the major face which carries the contact zones, defining a path for insertion of the card in a specified direction and including an end-of-travel microswitch which is actuated by a front edge of the card when the latter reaches a given position.

Numerous connectors of this sort are already known, e.g., from French Patent No. 2 665 027. According to this patent, the microswitch must be closed when the card is in a position in which its contact zones are definitely in contact with resilient electrically-conductive blades carried by a box to which the plate belongs, so as to give a signal enabling exchange of information between the card and circuits connected to the connector. In practice, the microswitch must close when the card travels the last five tenths of a millimeter of its set travel, before arriving in an abutment position. Moreover, this high precision must be obtained by only simple means.

Current connectors do not perfectly fulfil this criterion; in the majority of cases they use means for control of the microswitch by the card which are influenced by the thickness of the card which may vary within relatively considerable proportions, greater than 10%.

SUMMARY OF THE INVENTION

It is an object of the present invention to provide an electrical connector of the type defined hereinabove, which eases the tolerances on the thickness of the card, by simple means.

To this end, there is provided a connector having a rocker mounted on the microswitch for rotation about an axis which is (a) orthogonal to the direction of insertion of the card, (b) parallel to a planar surface of the support plate for supporting the card, and (c) distant from the support planar surface, the rocker having, opposite the rotation axis, a finger for abutting connection with the front edge of the card and a projection for mechanically actuating the microswitch. The actuation may occur by displacement orthogonal to the support plate.

By virtue of this arrangement, the position of the front edge of the card, and only that position, is effective for controlling the position of the rocker. Thus inaccuracies due to the thickness tolerances of the card are eliminated.

The rocker may have a stirrup shape with two articulation branches straddling a microswitch housing and directed substantially parallel to the finger which receives the edge. The finger may be placed so as to be substantially orthogonal to the direction of the card at the end of insertion of the latter.

The microswitch may be of any one of the well known types, particularly with a domed dish called "blister". The rocker may be placed so that the resiliency of the dish keeps the support finger on the path of insertion of the card. The length of the finger is sufficient for it not to escape the edge of the card, even when the latter has the minimum thickness within the manufacturing tolerances, when abutted by the card. The end part of the rocker, and particularly the finger, may however be sufficiently flexible to make it possible to clear the path of insertion of the card by forcing out possible objects with the aid of a blade, over the finger, by forcibly bending the latter.

The card may be held against the support plate, during insertion, by the metal blades necessary for connection with external circuits.

BRIEF DESCRIPTION OF THE DRAWINGS

The invention will be better understood upon reading the description which follows of a particular embodiment given by way of example.

DETAILED DESCRIPTION

Figure 1:
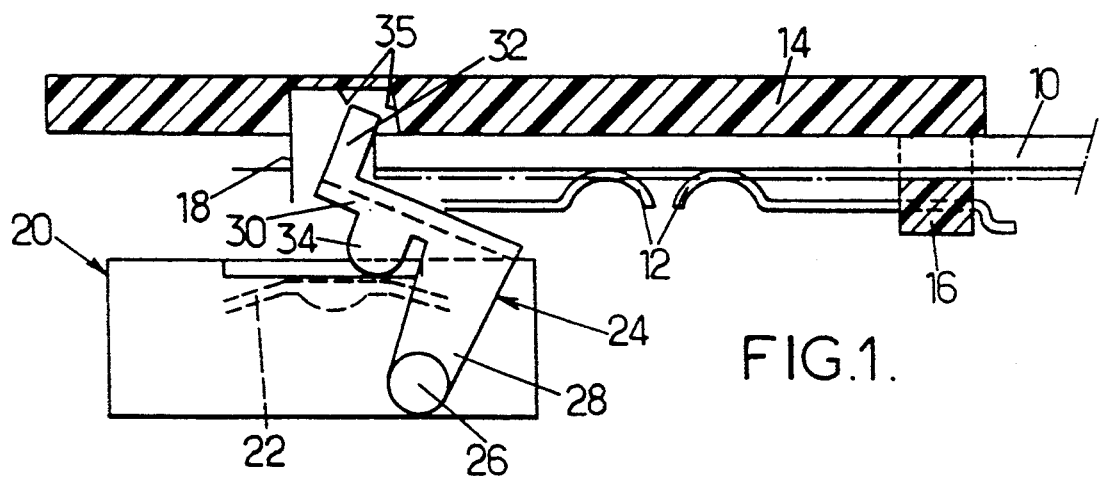
FIG. 1 is a schematic view, in cross-section, along a plane parallel to the direction of insertion of the card and orthogonal to the support plane of the card, showing the relative arrangement of the elements belonging to the invention, when the card just comes into contact with the rocker of the connector.
Figure 2:
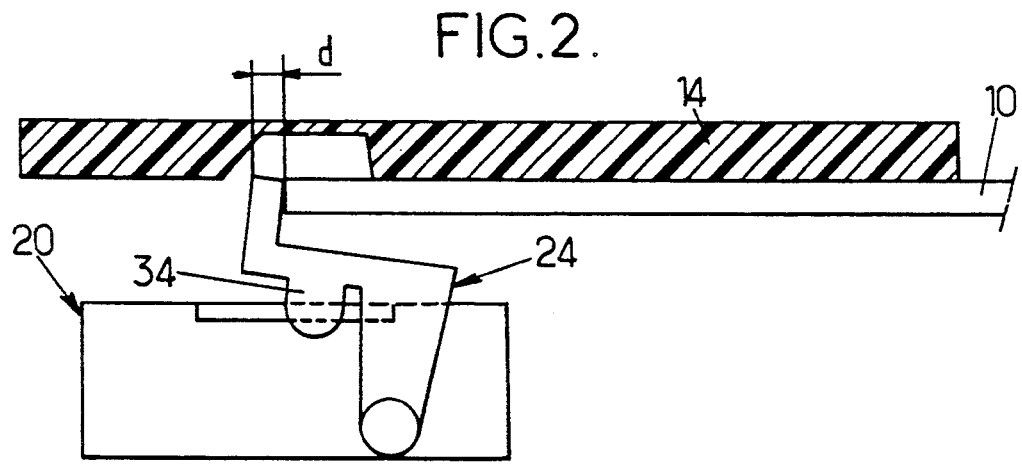
FIGS. 2 and 3, which are similar to FIG. 1, show the positions of the rocker, respectively when the card comes into the rearmost position for which the microswitch closes, and when the card comes into final abutment.

The general construction of the connector will not be described, because it may be any one of the well known constitutions making it possible to guide a card 10 along a path of insertion which allows contact zones formed on a major face thereof to come into electrical connection with conducting blades 12. Such connectors include a box or housing. FIG. 1 shows only an upper plate 14 of this box, having a lower support surface for sliding contact with the card 10, cooperating with lateral grooves (not shown) for defining a path of insertion of the card. Insulating pads or bosses 16 belonging to the box carry the blades 12, which comprise end loops preventing the card 10 from getting caught up as it is inserted. The blades 12, made from bronze strip for example, are subjected to sufficient prestress for them to keep the card 10 in abutment against the plate 14 as the card is inserted. Abutment shoulders 18 orthogonal to the direction of insertion mechanically limit the forward displacement of the card.

As indicated above, the thickness of the card 10 is not defined with high precision. FIG. 1 shows in solid lines a card of minimal thickness and, in chain-dotted lines, the lower surface of a card of maximum thickness.

The box carries a microswitch 20, fixed by any suitable means to the box, preferably by direct molding of the box onto the microswitch housing. This microswitch may have various constitutions. Often a microswitch will be used having a housing provided with electrical connection legs or pins, having an opening for access to a movable or deformable member 22 which, for example, is a blister disc which can snap from a condition having its convexity in one direction to a convexity in the opposite direction. The disc is capable of deforming, under the action of a force directed downwards from the position shown in FIG. 1; when deformed, it mutually connects contacts in the microswitch housing. It reverts to its original condition when released.

A control mechanism, located between the card 10 and the microswitch 20, includes a rocker 24 mounted for pivotal movement on the microswitch housing about an axis 26 which is parallel to the support plane defined by the plate 14 and orthogonal to the direction of insertion of the card. The distance of the axis 26 from the support plane and the shape of the rocker 24 are so selected that only the front edge of the card is involved in the displacement of the rocker 24. The latter may have the form of a stirrup comprising two arms 28 which straddle the housing of the microswitch 20, a crosspiece 30 which is perpendicular to the arms and a finger 32 for abutment by the front edge of the card 10. The cross piece 30 has a projection 34 extending in a direction opposite that of the finger 32, and intended to bear against the blister disc 22 of the microswitch 20.

Although the rocker 24 may be made of metal, it is generally made of plastic material, for example molded polyamide without fillers.

The displacements during the insertion of the card are then as follows.

The edge of the card first comes into abutment against the finger 32 of rocker 24, which is held by the disc 22. Abutment occurs before the card reaches the beginning of the fraction of its travel for which the microswitch must close. As the card 10 is further moved forwardly (to the left in FIG. 1), the rocker 24 pivots and the projection 34 progressively depresses the movable or deformable element of the microswitch 20. The latter and the rocker 24 are mutually placed so that the microswitch cannot close until the distance d between the edge of the card and its end position is less than a given value, for example 0.5 mm. The corresponding travel of the projection 34 is, for example, 0.3 mm. The card may still be moved forwardly as far as the abutment position, causing, for example, to an additional 0.5 mm depression of the movable or deformable element.

Figure 3:
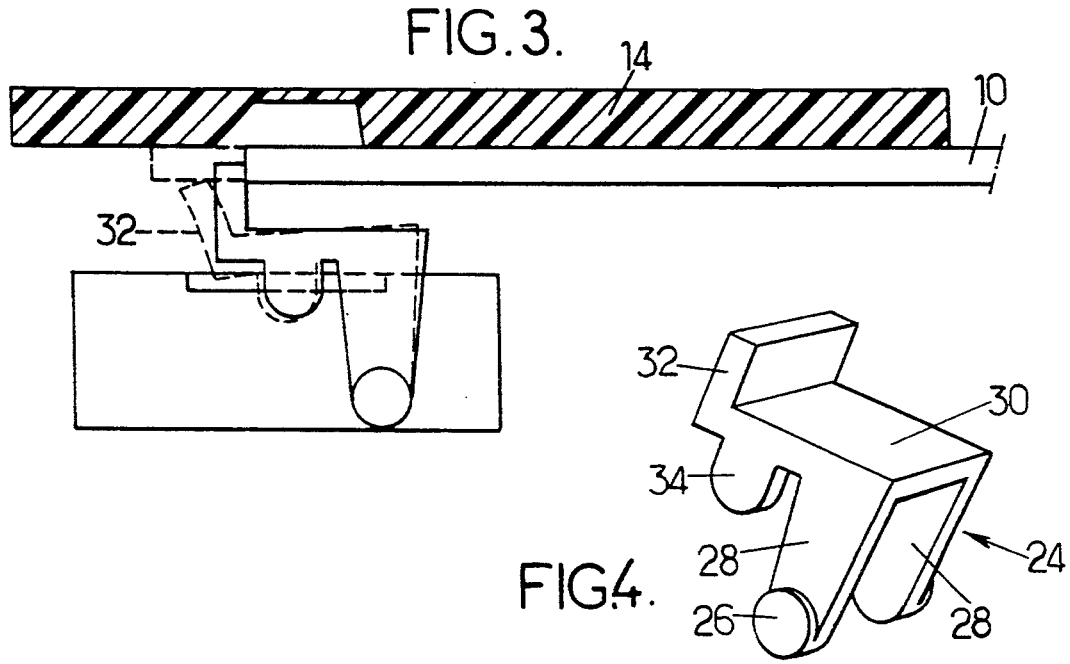
Figure 4:
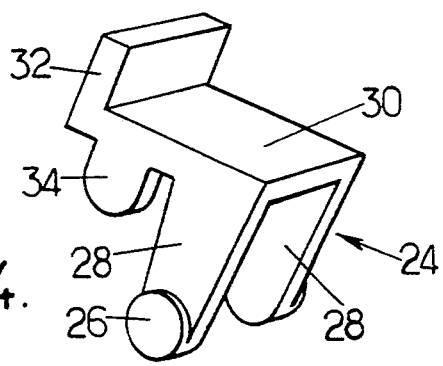
FIG. 4 is an isometric view of the rocker.

The finger may be constructed so that it can be deformed as indicated in dash lines in FIG. 3 when it is subjected to a force which exceeds that which is normally exerted by the card 10. That makes it possible, for example, eliminate clogging due to the insertion of a fragment of card or of cardboard by forcing this fragment over the finger 32, provided that an opening or a reception volume is provided beyond the microswitch.

The finger 32 should be of a sufficient size not to escape the card, even when the latter has a minimum thickness; a recess may be provided to provide a space which accommodates it when the rocker is in the rest position shown in FIG. 1. The recess may, for example, be a blind hole 35 formed, for example by molding, in the plate 14 which is generally of synthetic material.

I claim:

1. An electrical connector for a microcircuit containing card having electrical contact zones on a first major face thereof, said electrical connector comprising:
   (a) a support plate arranged for receiving a second major face of said card which is opposite said first major face and for defining a path for forward insertion of one said card in a predetermined direction;
   (b) a micro-switch having a stationary housing and arranged for operation by a front edge of said card when said card reaches a given position during said insertion in said predetermined direction; and
   (c) a single rocker means pivotably mounted on said housing for rotation about an axis which is orthogonal to said predetermined direction, parallel to said support plate and distant from a card support plate, said rocker means having, at an end thereof remote from said axis, a support finger for abutting connection with said front edge of said card and a projection for mechanically controlling said microswitch, said rocker means rotating about said axis when said front edge of said, card engage said support finger.

2. The connector according to claim 1, wherein said rocker means has the shape of a stirrup having branches which straddle a housing of said microswitch and which are substantially parallel to said support finger.

3. The connector according to claim 1, wherein said support finger is shaped so as to be substantially orthogonal to said predetermined direction of insertion of said card when said card is at an end of its forward travel.

4. The connector according to claim 1, wherein said support plate includes a recess for receiving said support finger when said support finger is in a rest position into which it is biased by a deformable element belonging to said micro-switch.

5. The connector according to claim 1, wherein said plate belongs to a housing, resilient blades being secured to said housing and located for contacting said contact zones and for biasing said card into sliding contact with said plate.

6. The connector according to claim 1, wherein said support finger has a degree of flexibility sufficient for resiliently deforming sufficiently to allow passage of a fragment of said card between said support finger and said support plate when said fragment is forced forwardly into and beyond said support finger.

7. An electrical connector for a microcircuit-containing card having electrical contact zones on a first major surface, said connector including:
   (a) a fixed connection housing having a support plate for slidably receiving a second major surface of said microcircuit-containing card which is opposite said first major surface and defining a path for forward insertion of one said card in a predetermined direction;
   (b) a micro-switch having a housing fixed to said connector housing; and
   (c) stirrup-shaped rocker means having:
      (i) a pair of branches straddling said micro-switch housing and pivotably connected into said micro-switch housing for rotation about an axis which is orthogonal to said predetermined direction, parallel to said support plate and distant from said support plate;
      (ii) a finger for abutting connection with a front edge of said microcircuit-containing card along said predetermined direction; and
      (iii) a projection located at a distance from said axis smaller than a distance of said support finger from said axis, shaped and located to control said micro-switch upon forced rotation of said rocker means by said microcircuit-containing card upon full insertion of the latter.

* * * * *

UNITED STATES PATENT AND TRADEMARK OFFICE
CERTIFICATE OF CORRECTION

PATENT NO. : 5,395,259
DATED : March 7, 1995
INVENTOR(S) : Claude Casses

It is certified that error appears in the above-indentified patent and that said Letters Patent is hereby corrected as shown below:

Title page, item [73], Assignee: the city of location is --Paris La Defense--.

Title page, item [75], inventor: should be --Claude Casses--.

Signed and Sealed this

First Day of August, 1995

Attest:

BRUCE LEHMAN

Attesting Officer

Commissioner of Patents and Trademarks